(12) United States Patent
Druant et al.

(10) Patent No.: US 11,942,832 B2
(45) Date of Patent: Mar. 26, 2024

(54) ELECTRIC DRIVE UNIT INCLUDING A FIRST ROTOR, A SECOND ROTOR, AND A STATOR FOR INDIVIDUAL TORQUE CONTROL OF VEHICLE WHEELS

(71) Applicant: Dana Belgium N.V., Bruges (BE)

(72) Inventors: Joachim Druant, Merkem (BE); Steven Vanhee, Staden (BE)

(73) Assignee: DANA BELGIUM N.V., Bruges (BE)

( * ) Notice: Subject to any disclaimer, the term of this patent is extended or adjusted under 35 U.S.C. 154(b) by 56 days.

(21) Appl. No.: 17/644,545

(22) Filed: Dec. 15, 2021

(65) Prior Publication Data

US 2022/0200413 A1    Jun. 23, 2022

(30) Foreign Application Priority Data

Dec. 17, 2020   (DE) .................... 10 2020 133 906.2

(51) Int. Cl.
  *H02K 11/20*   (2016.01)
  *H02K 1/12*    (2006.01)
  *H02K 1/22*    (2006.01)
  *H02K 11/30*   (2016.01)

(52) U.S. Cl.
  CPC ............. *H02K 11/30* (2016.01); *H02K 1/12* (2013.01); *H02K 1/22* (2013.01); *H02K 11/20* (2016.01)

(58) Field of Classification Search
  CPC . H02K 11/30; H02K 1/12; H02K 1/22; H02K 11/20; H02K 7/006; H02K 17/24; H02K 16/02; H02K 11/21; H02K 11/33; B60K 17/165; B60K 2001/001; H02P 21/00; H02P 27/06; H02P 25/22; H02P 5/46
  See application file for complete search history.

(56) References Cited

U.S. PATENT DOCUMENTS 6,401,849 B1 *   6/2002   Seguchi ................... B60K 1/02
                                                           180/65.6

FOREIGN PATENT DOCUMENTS

| CN | 106357194 B | * | 4/2019 | |
| DE | 102016207996 A1 | * | 11/2017 | ............. H02K 16/02 |
| JP | 2016201873 A | * | 12/2016 | |
| WO | WO-2020162734 A1 | * | 8/2020 | ........... B60K 7/0007 |

OTHER PUBLICATIONS

DE102016207996A1 English translation (Year: 2023).*
JP2016201873A English translation (Year: 2023).*
WO2020162734A1 English translation (Year: 2023).*
CN106357194B English translation (Year: 2023).*

* cited by examiner

*Primary Examiner* — Christopher M Koehler
*Assistant Examiner* — Viswanathan Subramanian
(74) *Attorney, Agent, or Firm* — McCoy Russell LLP (57) ABSTRACT

The present document relates to an electric drive unit, comprising: a stator configured to produce a stator magnetic field, at least a first rotor including first rotor windings, the first rotor windings for instance including multi-phase windings, and at least a first inverter electrically connected with the first rotor windings and configured to produce an electric current in the first rotor windings for producing a first rotor magnetic field. The stator magnetic field is configured to interact with the first rotor magnetic field to exert a torque on the first rotor. The present document further relates to a method of operating the electric drive unit.

16 Claims, 5 Drawing Sheets

ELECTRIC DRIVE UNIT INCLUDING A FIRST ROTOR, A SECOND ROTOR, AND A STATOR FOR INDIVIDUAL TORQUE CONTROL OF VEHICLE WHEELS

CROSS-REFERENCE TO RELATED APPLICATION

The present application claims priority to German Patent Application No. 10 2020 133 906.2, entitled "ELECTRIC DRIVE UNIT", and filed on Dec. 17, 2020. The entire contents of the above-listed application is hereby incorporated by reference for all purposes.

TECHNICAL FIELD

The present document relates to an electric drive unit and to a method of operating the electric drive unit. Electric drive units of the presently proposed type may find application in a driveline for an electric vehicle, for example.

BACKGROUND AND SUMMARY

Conventional torque vectoring electric axles may comprise an electric motor, a reducer and clutches. The pressure on the clutches may be controlled such that a total amount of driving torque is distributed among the drive axles, which is also denoted as torque split. For example, the torque may be split among a first and a second drive half axle wherein the first drive half axle may be a left drive half axle and the second drive half axle may be a right half axle and wherein each drive half axle may be drivingly connected or drivingly connectable to a vehicle wheel.

The torque split may also be denoted as torque vectoring. Said torque vectoring between the first and the second drive half axle, that is a ratio between an amount of torque provided to the first drive half axle and an amount of torque provided to the second drive half axle, may be adjusted according to a current driving situation. The advantage of active torque vectoring may be seen in a more robust and stable driving characteristics of the vehicle. However, in general, devices and/or a methods providing torque vectoring tend to be relatively complex and tend to comprise a large number of components and/or steps, which may increase a risk of degradation during assembly and/or operation.

Thus, there is demand for an electric drive unit featuring a torque vectoring functionality, for instance, having a low degree of complexity and that may be operated at a high efficiency.

The objective is achieved by an electric drive unit and by a method of operating the electric drive unit according to the independent claims. Special embodiments are described in the dependent claims. Exemplary embodiments are shown in the attached figures.

The presently proposed electric drive unit comprises a stator configured to produce a stator magnetic field and at least a first rotor including first rotor windings, the first rotor windings for instance including multi-phase windings. The electric drive unit also includes at least a first inverter electrically connected to the first rotor windings and configured to produce an electric current in the first rotor windings for producing a first rotor magnetic field, wherein the stator magnetic field is configured to interact with the first rotor magnetic field to exert a torque on the first rotor.

The fact that the presently proposed electric drive unit includes at least a first inverter electrically connected to the first rotor windings and configured to produce an electric current in the first rotor windings for producing a first rotor magnetic field allows controlling the electric drive unit, such as with a high degree of efficiency and flexibility as compared to electric drive units known from the prior art. For example, the first inverter may be configured to generate or produce an electric current in the first rotor windings for producing a first rotor magnetic field which is optimized or adapted based on a current driving situation.

The stator magnetic field may be a rotating magnetic field having a rotational axis and a rotational speed. In general, a rotational speed may also be denoted as a rotational frequency. The rotational axis of the stator magnetic field may be oriented substantially parallel to a rotational axis of the first rotor. The first rotor may be rotatably supported and may be configured to rotate about the rotational axis The first rotor magnetic field may be a rotating magnetic field rotating relative to the rotor. The first rotor magnetic field may rotate about a rotational axis oriented substantially parallel to the rotational axis of the first rotor. The first rotor magnetic field may rotate with a rotational speed or frequency equal to a rotational speed or frequency of a rotating stator magnetic field. The first rotor may rotate with a rotational speed equal to a rotational speed of the first rotor magnetic field. The first rotor may also rotate with a rotational speed different from a rotational speed of the first rotor magnetic field.

The first inverter typically includes a plurality of power electronic switches and is configured to generate or provide an electric current in the first rotor windings. The electric current generated or provided by the first inverter may be characterised by one or more of a magnitude, a frequency and a phase.

The electric drive unit may further comprise a second rotor including second rotor windings. For instance, the second rotor windings may include multi-phase windings. The electric drive unit may then further comprise a second inverter electrically connected to the second rotor windings. The second inverter may then be configured to produce an electric current in the second rotor windings for producing a second rotor magnetic field, and the stator magnetic field may then be configured to interact with the second rotor magnetic field to exert a torque on the second rotor. The second inverter typically includes a plurality of power electronic switches and is configured to generate or provide an electric current in the second rotor windings. The electric current generated or provided by the second inverter may be characterised by one or more of a magnitude, a frequency and a phase.

A rotational axis of the stator magnetic field may be oriented substantially parallel to a rotational axis of the second rotor. The second rotor may be rotatably supported and may be configured to rotate about the rotational axis of the second rotor. The rotational axes of the first rotor and of the rotational axis of the second rotor may be aligned in parallel or coaxially.

The second rotor magnetic field may be a rotating magnetic field rotating relative to the second rotor. The second rotor magnetic field may rotate about a rotational axis oriented substantially parallel to the rotational axis of the second rotor. The second rotor magnetic field may rotate with a rotational speed or frequency equal to a rotational speed or frequency of a rotating stator magnetic field. The second rotor may rotate with a rotational speed equal to a rotational speed of the second rotor magnetic field. The second rotor may also rotate with a rotational speed different from the rotational speed of the second rotor magnetic field.

Furthermore, the first rotor and the second rotor may rotate at the same rotational speed or at different rotational speeds. For example, the electric drive unit including a first rotor with first rotor windings electrically connected to a first inverter, and including a second rotor with second rotor windings electrically connected to a second inverter may be operated as a differential and/or may improve vehicle stability, such as in difficult environments, for example when driving off-road or under varying road conditions.

The first inverter and the second inverter may be equal or similar to one another or different from one another with respect to their design and construction.

The electric drive unit may further comprise a first vehicle wheel and a second vehicle wheel. The first rotor and the second rotor may be axially aligned, and the first rotor may be drivingly connected or may be drivingly connectable with the first vehicle wheel. Also, the second rotor may be drivingly connected or may be drivingly connectable with the second vehicle wheel.

For example, the first rotor may exert a torque on the first vehicle wheel and the second rotor may exert a torque on the second vehicle wheel. The torque exerted on the first vehicle wheel may be different from or equal to or substantially equal to the torque exerted on the second vehicle wheel. The first rotor and/or the second rotor may be connected or connectable with a steering system of a vehicle. For example, the electric drive unit may be used to drive a steered axle. This allows for a great flexibility in using the electric drive unit, for example in a four wheel drive vehicle or a two wheel drive vehicle.

The electric drive unit may further comprise a third inverter. Usually, the stator includes stator windings. The stator windings may include multi-phase windings. The third inverter may be electrically connected to the stator windings. In addition, the third inverter may be configured to produce an electric current in the stator windings for producing the stator magnetic field. The third inverter typically includes a plurality of power electronic switches and is configured to generate or provide an electric current in the stator windings. The electric current generated or provided by the third inverter may be characterised by one or more of a magnitude, a frequency and a phase.

The first inverter may be configured to produce an AC and/or a DC electric current in the first rotor windings, and/or the second inverter may be configured to produce an AC and/or a DC electric current in the second rotor windings. The capability of providing DC and AC electric currents allows operating the electric drive unit in a mode similar or equal to the operation of an electrical induction motor and/or a synchronous electrical motor. In addition, the first rotor in combination with the stator may be operated in a mode different or equal from/to a mode of the second rotor in combination with the stator. The phrase 'in combination' refers here and subsequently to an interaction between rotor and stator, or more specifically, to an interaction between the first and/or second rotor magnetic field and the stator magnetic field, for example to exert a torque on one or both of the rotors.

For example, in combination with the stator, the first rotor and/or the second rotor may be operated as a synchronous motor or similar to a synchronous motor. Equally, in combination with the stator, the second rotor and/or the first rotor may be operated as an induction motor or similar to an induction motor including a slip between a rotating stator magnetic field and one or both of the first rotor and the second rotor. For example, one of the rotors may be operated, in combination with the stator, as a synchronous motor or similar to a synchronous motor, while the other rotor, in combination with the stator, may be operated as an induction motor or similar to an induction motor.

The electric drive unit may be operated flexibly and based on a current driving situation, for example. This allows operating the electric drive unit with a high degree of efficiency, such as with reduced or minimized losses.

The first inverter and/or the second inverter may include a low voltage inverter. In addition, the third inverter may include a high voltage inverter. A maximum operating voltage of the high voltage inverter is greater than a maximum operating voltage of the low voltage inverter. The maximum operating voltage of the low voltage inverter may be at most 60 V or at most 48 V. The maximum operating voltage of the high voltage inverter may be higher than 60V, higher than 200V or higher than 380V. A low voltage inverter may be manufactured with an electronic component such as, for example, a MOSFET (MOSFET: metal oxide semiconductor field-effect transistor), that may be cheaper than an electronic component such as, for example, an IGBT (IGBT: insulated-gate bipolar transistor) that may be used within a high voltage inverter. Other electronic components, for example a resistor, a capacitor, a diode, a transistor other than MOSFET or IGBT, a fuse, a heat sink, an electrical insulation and a wire or a cable may also be cheaper for the low voltage inverter than for the high voltage inverter since a requirement regarding dissipated power and/or a power consumption may be less restrictive. The low voltage inverter may also be smaller in a physical dimension than the high voltage inverter. Therefore, it is possible to select a suitable inverter matching power, voltage and size requirement of the connected windings in an optimal manner.

Both, the low voltage and high voltage inverter may be operated in one or more different modes, for example in a four-quadrant-mode or in a two-quadrant-mode, where it is possible to provide electric power to connected windings and where it is possible to receive electric power from connected windings. It is, however, also possible, for example, to operate the inverters in a single-quadrant-mode where electric power is provided to connected windings.

The electric drive unit may comprise at least one energy storage device such as one or more batteries electrically connected with the first inverter, for instance further electrically connected with the second inverter and/or with the third inverter. One or more of batteries may be rechargeable. For example, one or more of the batteries may comprise a lithium battery and/or a lithium ion cell which may be, for example, recharged electrically. In another example, one or more of the batteries may comprise a fuel cell. A fuel cell may be, for example, recharged with a supply of hydrogen. Generally, other types of batteries are possible, such as, as a non-limiting example, a super cap, a zinc carbon battery or a lead accumulator. It is also conceivable that one or more of the inverters are connected to a generator of electric power, such as an electrical machine or solar power system.

The first rotor in combination with the stator and/or the second rotor in combination with the stator may be operated as a generator of electric power configured to provide electric power to the first and/or second inverter, respectively. At the same time, the stator magnetic field may interact with the first rotor magnetic field and/or with the second rotor magnetic field to exert a torque on the first rotor and/or on the second rotor, respectively. Also, electric power may be provided from the stator to the third inverter.

Optionally, the first rotor in combination with the stator and/or the second rotor in combination with the stator and/or the stator may provide electric power to one or more of the inverters which may, for example, transfer the electric power received from the stator and/or from one or both of the rotors to the at least one energy storage device. Also, different ones of the first and the second rotor and the stator may at the same time provide electric power to the energy storage device and receive electric power from the energy storage device, for example if or when one of the rotors in combination with the stator is operated as generator and the other of the rotors in combination with the stator is operated as an electric motor.

An inverter which receives electric power from a rotor may be electrically connected to an inverter that provides electric power to a rotor. It is also conceivable that the first inverter receives electric power from the first rotor and provides electric power to the energy storage device while, for example simultaneously, the second inverter receives electric power from the energy storage device and provides electric power to the second rotor. Electric power may hence be transferred from the first rotor to the second rotor. The transfer of electric power may take place in the opposite direction as well, for example from the second rotor to the first rotor via the second inverter, the energy storage device and the first inverter. Therefore, electric power may be transferred from the first rotor to the second rotor or from the second rotor to the first rotor.

The first rotor in combination with the stator may be operated as generator, and/or the second rotor in combination with the stator may be operated as an electric motor. Similarly, the first rotor in combination with the stator may be operated as an electric motor, and/or the second rotor in combination with the stator may be operated as a generator. That is, the first rotor and the second rotor may be operated independently either as an electric motor and/or as an electric generator. While working as a generator, a rotor may at the same time provide torque to a wheel. This may allow energy to be transferred from one of the rotors to the other, for example in a driving situation where one vehicle wheel is decelerated and the other vehicle wheel is accelerated. Since at least a part of the acceleration power may be provided by the deceleration power, the electric drive unit may be operated in a power efficient manner.

The energy storage device of the electric drive unit may comprise a low voltage energy storage device. Said low voltage energy storage device may be electrically connected with the first inverter and may be further electrically connected with the second inverter. The at least one energy storage device of the electric drive unit may also include a high voltage energy storage device wherein said high voltage energy storage device may be electrically connected with the third inverter.

A maximum operating voltage of the high voltage energy storage device may be higher than a maximum operating voltage of the low voltage energy storage device. for instance, the maximum operating voltage of the high voltage energy storage device is higher than 60 V, higher than 200 V, or higher than 380 V, and/or the maximum operating voltage of the low voltage energy storage device is at most 60 V, or at most 48 V.

In general and as described above in the context of low and high voltage inverters, a low voltage energy storage device may be cheaper than a high voltage energy storage device due to less restrictive power requirements, electrical insulation requirements and requirements regarding power dissipation of the electrical and mechanical components. Therefore, it is possible to select a suitable battery matching voltage and size requirements of the connected inverter at optimal costs.

The electric drive unit may further comprise at least one sensor configured to produce at least one sensor signal. The electric drive unit may also include at least one controller configured to control the first inverter, such as further configured to control the second inverter and/or the third inverter. The at least one sensor signal and/or its values may be specific for an operating situation, for example a driving situation of a vehicle. The controller may be configured to determine a suitable response to this specific driving situation which is to be executed by the vehicle. The controller may control the first and/or second and/or third inverter accordingly, for example by providing suitable control signals corresponding to the electric currents to be provided by the respective inverter.

The at least one sensor of the electric drive unit may include one or more of an accelerator actuator sensor, a steering sensor, a first rotor position sensor and a second rotor position sensor. The first rotor position sensor is configured to acquire first rotor position data indicative of a rotational position of the first rotor, and the second rotor position sensor is configured to acquire second rotor position data indicative of a rotational position of the second rotor. The accelerator actuator sensor is configured to acquire a state of the accelerator actuator, for example an angle of an accelerator pedal, indicative of an amount of torque that the electric drive unit is requested to provide. The steering sensor is configured to acquire a state of the steering, for example an angle of a steering wheel, indicative of a direction request, for example for the vehicle in which the electric drive unit may be disposed.

For example, the first and/or the second rotor position sensor may be implemented with a key phasor. Based on the signal provided by the rotor position sensor, a rotational position of the rotor, for example in units of degrees of an angle, may be determined. Furthermore, a rotational speed of a rotor can be inferred from the rotational position of a rotor by means of a mathematical differentiation. In addition, an observer based method may be used to estimate a rotor position and/or a rotational speed of a rotor.

It is conceivable that further sensors are used, for example a sensor providing visual information like a camera or a light sensor, a distance sensor, for example a radar or an ultrasound distance measurement device, an acceleration sensor, a vibration sensor, or, for example, a rain sensor or a sensor measuring a humidity, a temperature and/or a pressure, for example an air pressure. A sensor indicating a state of the engine or the state of another device of the vehicle may be used as a further sensor as well. Such a further sensor may be placed within and/or at the compartment, the chassis and/or the engine. These further sensors may provide information that may be used to detect a drive situation and/or to evaluate a drive situation and to determine a suitable response generated by the electric drive unit.

One or more control algorithms may be implemented within the controller. For example, one part of the controller may control a vehicle dynamics such as a direction of movement, a speed, and a torque in one or more translational and/or rotational directions. Another part of the controller may determine one or more of the currents to be provided by the inverters, that is the first and/or the second and/or the third inverter, and a part of the controller may control the inverters to provide the determined currents. A further part of the controller may control a value of a magnitude and/or frequency and/or phase of an electric current actually provided by the inverters. It is also possible that a part of the controller is disposed within an inverter. It is hence possible to centralize or to decentralize control operations within a vehicle as appropriate. A centralization may be advantageous if the control operations need to be coordinated. A decentralization may be advantageous otherwise or if a part of the controller shall be close to the controlled device within a vehicle.

It is conceivable that the controller minimizes a cost function or minimizes a cost function with a constraint in order to determine a magnitude and/or a frequencies of one or more of the electric currents to be provided by one or more of the inverters. These values may be considered as optimum values in terms of efficiency, dynamics, power and/or costs or a combination thereof. The minimization can be accomplished by way of a mathematical procedure or algorithm which is implemented within the controller, for example by means of a software program. It is in general also possible to perform the minimization using an electronic circuit, for example an analogue computer and/or a digital electronic circuit that may be implemented in a FPGA (FPGA: field programmable gate array) or an ASIC (ASIC: application-specific integrated circuit).

It is possible that the one or more control algorithms include a vector control algorithm also known as field-oriented control. Within the context of vector control there are two orthogonal components forming an electric current provided by an inverter. The two orthogonal components, that is, a magnetizing current $I_d$ and a torque current $I_q$, can be controlled independently, for example with a PI controller and/or a PID controller.

Field oriented control may provide a framework that allows a flexible and precise control of an electric motor. It may be the case that the independent control of the magnetizing current $I_d$ and the torque current $I_q$ allow for a simplification of the applied control algorithms. This simplification may concern a current controller controlling the amplitude of a current and it may concern the cost function to be minimized.

In an embodiment the controller of the electric drive unit is configured to evaluate the cost function having at least magnitudes of the electric currents in the windings as inputs. The cost function may also have the electrical frequency of the electrical current in the stator windings as input. It may also have the frequency of the electrical current in the first rotor windings and/or the second rotor windings as input. The controller may control the first inverter, the third inverter and the second inverter based on the evaluation. The electric currents may include the magnetizing current $I_d$ and/or the torque current $I_q$ provided by one or more of the inverters.

It is possible that function values of the cost function correlate with ohmic losses, iron losses and/or inverter losses associated with the inputs of the cost function. For this, the cost function may also include a further parameter. For example, the cost function may use a further parameter corresponding to a characteristic property of a material used within the electric drive unit and/or the electric drive unit design. Examples for a characteristic property of a material are an ohmic resistance of the rotor windings and/or the stator windings, a capacity, an inductance of the rotor windings and/or the stator windings and a parameter concerning a magnetization property of a material used in the electric design unit, for example a permeability, which may be non-linear. Further parameters may concern a dimension of a component of the electric drive unit, for example a thickness of a laminated metal sheet. Also, a switching characteristics of a transistor, for example a MOSFET or an IGBT, in one or more of the inverters, a resistance value within the transistors and also a switching frequency of a pulse width modulation that may be used within the inverters are examples for the further parameter of the cost function. Also, the further parameter may relate to a current operating situation, such as the rotational speed of the first rotor and/or the rotational speed of the second rotor. Function values of the cost function may also correlate with mechanical losses, for example due to friction in a bearing supporting a rotor or friction with surrounding air, and/or with harmonic losses.

It is hence possible to design the cost function to include parameters of interest, such as to include parameters concerning an efficiency and/or losses of a vehicle as a whole and/or of one or more parts of the vehicle.

An input of the cost function may be processed within the cost function. For example, the input may be squared. It may also be that the processed input is weighted with a factor that may relate to one or more of the further parameters and that the weighted processed input is added within the cost function, for example to another weighted processed input.

In an embodiment it is possible that the controller is configured to control the inverters such as to minimize the cost function.

The cost function may be minimized with respect to an input, for example with respect to the electric current in the first rotor windings and/or the second rotor windings and/or the stator windings. A minimization may be accomplished under consideration of an equality and/or an inequality constraint. The equality constraint may, for example, be a torque to be exerted on the first rotor and/or a torque to be exerted on the second rotor. The inequality constraint may be, for example, a maximum voltage and/or maximum electrical current that may be provided by one or more of the inverters.

It is hence possible to include parameters that relate to a current drive situation, like torque and/or speed, into the cost function and to find a minimum of the cost function that represents, for example, the most power efficient way to operate the electric drive unit in this current drive situation.

In an embodiment, the controller is configured to control the magnitude and/or frequency of an electrical current in the first rotor windings produced by the first inverter, and for instance to control the magnitude and/or frequency of an electrical current in the second rotor windings produced by the second inverter, based on the evaluation of the cost function and based on the first rotor position data and/or based on the second rotor position data. For example, the controller may control the magnitude and/or frequency of the electrical current produced by the first inverter and/or the magnitude and/or frequency of the electrical produced by the second inverter in a way such that they correspond to a minimum value of the cost function and/or a minimum value of the cost function under consideration of an equality constraint and/or an inequality constraint. This may lead to an efficient operation of the electric drive unit, for example with respect to its power consumption.

The controller may be configured to control the first inverter and the third inverter and for instance the second inverter such that magnetic fields produced by electric currents in the rotating rotor windings and in the stator windings rotate at the same frequency as the stator magnetic field. One or more of the electric currents in the rotating rotor windings may be DC currents. It is also possible that one or more of the electric currents in the rotating rotor windings are AC currents. The rotational speeds of the first rotor and/or the second rotor may be equal to the rotational frequency of the respective rotor magnetic field and hence equal to rotational frequency of the stator magnetic field.

However, it is also possible that the rotational speeds of the first rotor and/or the second rotor are different from the rotational frequency of the respective rotor magnetic field and hence different from the rotational frequency of the stator magnetic field. In addition it is possible that the rotational speed of the first rotor is equal to or different from the rotational speed of the second rotor. It is even conceivable that the speed of the first rotor is independent from the speed of the second rotor and/or vice versa. As becomes clear from the above, the electric drive unit is conceptually very flexible. The existence of the various operating modes with respect to rotor speed in relation to the speed of the respective other rotor and/or the rotor magnetic field allows for an efficient operation of a vehicle in a wide range of possible drive situations.

The controller may be configured to determine a first target torque $T_1$ to be exerted on the first rotor and to determine a second target torque $T_2$ to be exerted on the second rotor. The determination may be based on a current driving situation and may additionally or alternatively be based on driver input which may, for example, be detected with a sensor. For example, the sensor may be the accelerator actuator sensor which may detect a torque request of a driver. Similarly, for example in case of an autonomous vehicle, the torque request may be generated by a technical device, for example a computer. Also, the torque request may be generated by a vehicle speed controller which may be a part of the controller. The determination of the target torque may also consider a directional information, for example a direction into which a vehicle is turning and/or an information about an angle of a steering sensor which may correspond to the drivers request regarding the direction of driving. The direction of driving may also be determined by a technical device, for example a controller and/or a computer as, for example, in autonomous driving and/or as determined for example by a lane assistant device which may be a part of the controller.

The controller may be configured to control the inverters such as to exert on the first rotor a torque within a range of the first target torque $T_1$, and such as to exert on the second rotor a torque within a range of the second target torque $T_2$. As the torque, such as the target torque $T_1$ and/or $T_2$, may be used as a constraint when minimizing the cost function, it is possible to command the inverters to substantially provide the currents with magnitude and/or frequency and/or phase needed to generate the torque on the first rotor and on the second rotor as determined by the controller.

The controller may be configured to control the third inverter based on rotational speeds $\Omega_1$, $\Omega_2$ of the first rotor and of the second rotor, respectively. The rotational speed may also be denoted as rotational frequency. Controlling the third inverter may include controlling the magnitude, the frequency and the phase of the current provided by the third inverter. Magnitude and frequency of the current provided by the third inverter may be a result of the minimization of the cost function. The phase of the current provided by the third inverter may also be a result of the minimization of the cost function.

A magnitude and a frequency of a current in windings typically relates to a voltage in windings, for example the first rotor windings and/or the second rotor windings and/or the stator windings. It is possible that a magnitude of the voltage in windings is constrained due to physical limitations of one or more components or the design of the electric drive unit. Such a constraint may be, for example, a predetermined voltage level like a DC link voltage level in one or more of the inverters which provide voltage and current to the respective windings. Due to this limitation and the relation between voltage and current, it is possible that magnitude and/or frequency of the current are constrained. This constraint may be considered when minimizing the cost function, for example as a constraint with respect to a voltage and/or with respect to a current.

The controller may be configured to control the third inverter such that a rotational frequency of a rotating magnetic field produced by electric currents in the stator windings is in between the rotational speed of the first rotor $\Omega_1$ and the rotational speed of the second rotor $\Omega_2$.

The controller may be configured to control the third inverter such that the rotational frequency of the rotating magnetic field produced by electric currents in the stator windings is below the rotational speed of the first rotor $\Omega_1$ and the rotational speed of the second rotor $\Omega_2$. And it is possible as well that the controller is configured to control the third inverter such that the rotational frequency of the rotating magnetic field produced by electric currents in the stator windings is above the rotational speed of the first rotor $\Omega_1$ and the rotational speed of the second rotor $\Omega_2$.

The controller may be configured to control the third inverter such that the rotational frequency of the rotating magnetic field produced by the electric currents in the stator windings is close to the rotational speed of the rotor with the greater target torque $T_1$ or $T_2$. For example, a rotational frequency of the rotating stator magnetic field may deviate from the rotational speed or frequency of the rotor providing or transmitting the greater torque by at most 5 percent, by at most 2 percent, or by at most 1 percent. In this way, power transmission through the first and/or the second inverter may be limited.

The controller may be configured to control the first inverter and the second inverter and/or the third inverter such that a value of an operating parameter of the first inverter and a value of an operating parameter of the second inverter and/or of the third inverter does not exceed a predetermined maximum value. For example, as may be apparent from previous explanations, such an operating parameter may be a magnitude of a voltage and/or a current provided to the windings of the first and/or the second rotor and/or the stator. Other examples for such an operating parameter may be a frequency of a current and/or a temperature. These operating parameters may be considered separately and in a combination.

The presently proposed method of operating of the above-described electric drive unit may comprise one or more of the following steps:

producing a stator magnetic field, and using the first inverter to produce an electric current in the first rotor windings to produce a first rotor magnetic field, wherein the stator magnetic field interacts with the first rotor magnetic field to exert a torque on the first rotor.

The method may include the steps of:

using the second inverter to produce an electric current in the second rotor windings to produce a second rotor magnetic field, wherein the stator magnetic field interacts with the second rotor magnetic field to exert a torque on the second rotor.

The method may include one or more of the following steps:

axially aligning the first rotor and the second rotor, drivingly connecting the first rotor with the first vehicle wheel or making the first rotor drivingly connectable with the first vehicle wheel, drivingly connecting the second rotor with the second vehicle wheel or making the second rotor drivingly connectable with the second vehicle wheel.

The method may include one or more of the following steps:
electrically connecting the third inverter with the stator windings,
producing an electric current in the stator windings for producing the stator magnetic field.

The method may include one or more of the following steps:
producing, with the first inverter, an AC and/or a DC electric current in the first rotor windings,
producing, with the second inverter, an AC and/or a DC electric current in the second rotor windings.

The method may include one or more of the following steps:
producing, with the first inverter and/or the second inverter, an AC and/or a DC electric current in the first rotor windings and/or the second rotor windings relating to a low operating voltage of the first inverter and/or the second inverter,
producing, with the third inverter, an AC and/or a DC electric current in the stator windings relating to a high operating voltage of the third inverter,
wherein a maximum operating voltage of the high voltage inverter is greater than a maximum operating voltage of the low voltage inverter or of the low voltage inverters, wherein the maximum operating voltage of the low voltage inverter may be at most 60 V or at most 48 V, and/or wherein the maximum operating voltage of the high voltage inverter may be higher than 60V, higher than 200V or higher than 380V.

The method may include one or more of the following steps:
electrically connecting the first inverter to the energy storage device,
electrically connecting the second inverter to the energy storage device,
electrically connecting the third inverter to the energy storage device, The method may include one or more of the following steps:
Electrically connecting the first inverter to the low voltage energy storage device
Electrically connecting the second inverter to the low voltage energy storage device
Electrically connecting the third inverter to the high voltage energy storage device,
wherein a maximum operating voltage of the high voltage energy storage device is higher than a maximum operating voltage of the low voltage energy storage device, wherein the maximum operating voltage of the high voltage energy storage device may be higher than 60 V, higher than 200 V, or higher than 380 V, and/or wherein the maximum operating voltage of the low voltage energy storage device may be at most 60 V, or at most 48 V.

The method may include one or more of the following steps:
producing at least one sensor signal,
controlling the first inverter,
controlling the second inverter,
controlling the third inverter
wherein controlling the first inverter and/or the second inverter and/or the third inverter may be based on the at least one sensor signal.

The method may include the step of acquiring first rotor position data indicative of a rotational position of the first rotor.

The method may include the step of acquiring second rotor position data indicative of a rotational position of the second rotor.

The method may include the step of inferring a rotational speed of the first rotor and/or a rotational speed of the second rotor. The rotational speed of the first rotor may be inferred from the rotational position of the first rotor and the rotational speed of the second rotor may be inferred from the rotational position of the second rotor, for example.

The method may include the step of acquiring a state of the accelerator actuator indicative of an amount of torque that the electric drive unit is requested to provide.

The method may include the step of determining a steering angle indicative of a direction request.

The method may include one or more of the steps:
evaluating a cost function having at least magnitudes of the electric currents in the windings and the electrical frequency of the electrical current in the stator windings as inputs
controlling the first inverter, the third inverter and for instance the second inverter based on the evaluation.

The function values of the cost function may correlate with ohmic losses, iron losses and/or inverter losses associated with the inputs of the cost function.

The method may include the step of controlling one or more of the first inverter, the second inverter and the third inverter such as to minimize the cost function.

The method may include one or more of the steps:
controlling the magnitude and/or frequency of an electrical current in the first rotor windings produced by the first inverter,
may be controlling the magnitude and/or frequency of an electrical current in the second rotor windings produced by the second inverter,
based on the evaluation of the cost function and based on the first rotor position data and/or based on the second rotor position data.

The method may include the step of controlling the first inverter and the third inverter and the second inverter such that magnetic fields produced by electric currents in the rotor windings and in the stator windings rotate at the same frequency with respect to the stator.

The method may include one or more of the steps:
determining a first target torque to be exerted on the first rotor,
determining a second target torque to be exerted on the second rotor,
controlling the inverters such as to exert on the first rotor a torque within a range of the first target torque,
controlling the inverters such as to exert on the second rotor a torque within a range of the second target torque.

The method may include the step of controlling the third inverter based on rotational speeds $\Omega_1$, $\Omega_2$ of the first rotor and of the second rotor, respectively.

The method may include one or more of the steps:
controlling the third inverter such that a rotational frequency of a rotating magnetic field produced by electric currents in the stator windings is in between $\Omega_1$ and $\Omega_2$,
controlling the third inverter such that a rotational frequency of a rotating magnetic field produced by electric currents in the stator windings is below $\Omega_1$ and $\Omega_2$, controlling the third inverter such that a rotational frequency of a rotating magnetic field produced by electric currents in the stator windings is above $\Omega_1$ and $\Omega_2$.

The method may include the step of controlling the first inverter and the second inverter and/or the third inverter such that a value of an operating parameter of the first inverter and a value of an operating parameter of the second inverter and/or of the third inverter does not exceed a predetermined maximum value.

BRIEF DESCRIPTION OF THE FIGURES

The Figures described herein illustrate embodiments of the presently disclosed subject matter, and are illustrative of selected principles and teachings of the present disclosure.

DETAILED DESCRIPTION

Figure 1A:
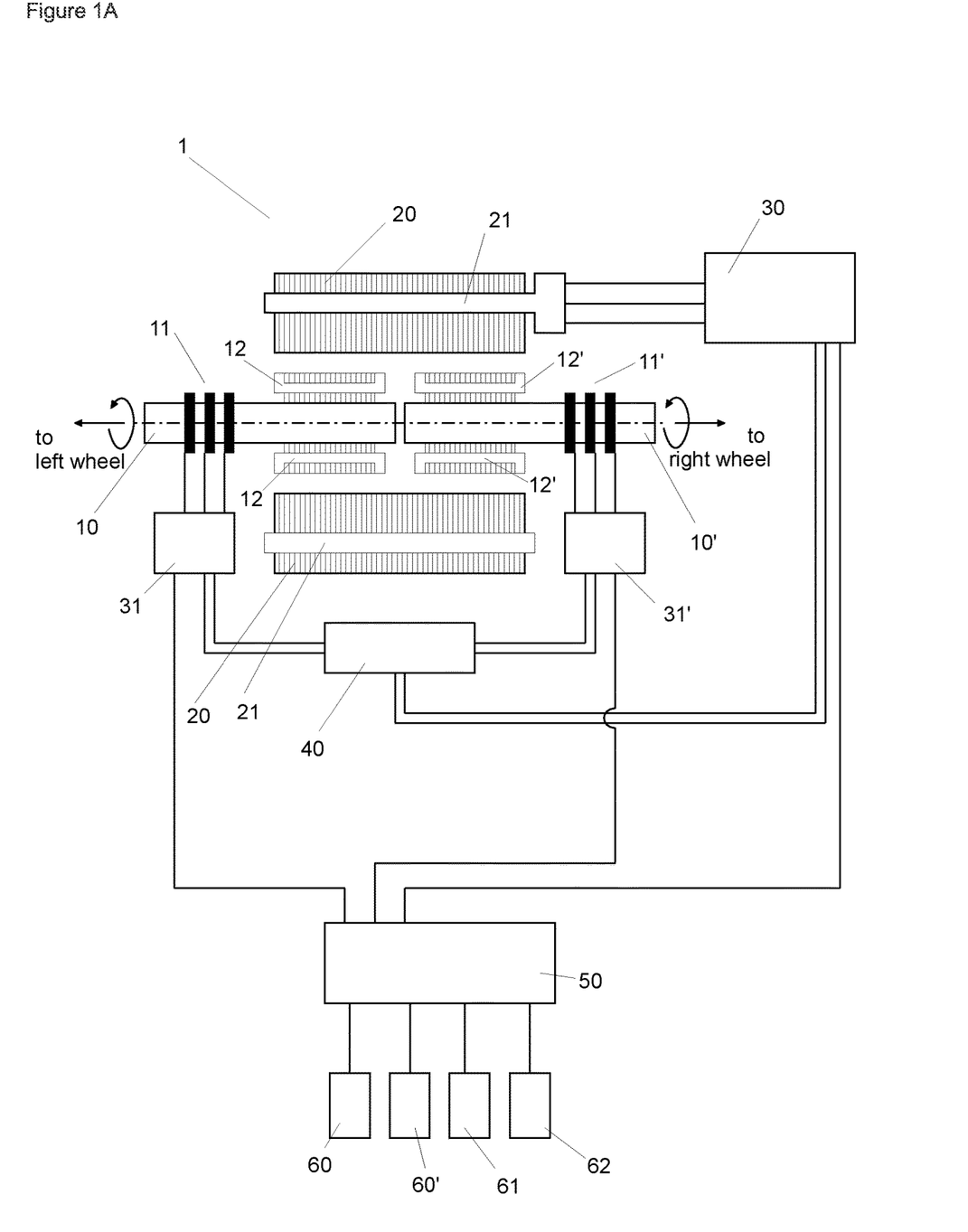
FIG. 1A schematically shows an embodiment of an electric drive unit of the presently proposed type with two rotors in a stator and an energy storage device.

FIG. 1A schematically shows an embodiment of an electric drive unit 1 of the presently proposed type. The electric drive unit 1 comprises a stator 20 including stator windings 21. The electric drive unit 1 further includes a first rotor 10 with first slip rings 11 and first rotor windings 12 electrically connected to the first slip rings 11. In addition, the electric drive unit 1 includes a second rotor 10' with second slip rings 11' and second rotor windings 12' electrically connected to the second slip rings 11'. Both, the first rotor 10 and the second rotor 10' are disposed within the stator 20. The first rotor 10 and the second rotor 10' are rotatably supported and configured to rotate with respect to the stator 20. In FIG. 1A the first rotor 10 and the second rotor 10' are axially aligned.

That is, in FIG. 1A the electric drive unit 1 is configured as an internal rotor machine. In another embodiments not explicitly depicted here, may be configured as an external rotor machine wherein the stator is disposed or at least partially disposed within the first rotor and/or the second rotor.

The electric drive unit 1 further includes a first inverter 31 and a second inverter 31'. The first rotor windings 12 are electrically connected to the first inverter 31 via the first slip rings 11. Similarly, the second rotor windings 12' are electrically connected to the second inverter 31' via the second slip rings 11'. The electric drive unit 1 further includes a third inverter 30. The stator windings 21 are electrically connected to the third inverter 30. The first rotor windings 12 and/or the second rotor windings 12' and/or the stator windings 21 may include multi-phase windings.

The first inverter 31 is configured to provide and/or receive an electric current, for example a DC electric current and/or an AC electric current, to/from the first rotor windings 12. The first inverter 31 is configured such that electric power may be transmitted between the first rotor windings 12 and the first inverter 31, for example from the first rotor windings 12 to the first inverter 31 and/or from the first inverter 31 to the first rotor windings 12.

The second inverter 31' is configured to provide and/or receive an electric current, for example a DC electric current and/or an AC electric current, to/from the second rotor windings 12'. The second inverter 31' is configured such that electric power may be transmitted between the second rotor windings 12' and the second inverter 31', for example from the second rotor windings 12' to the second inverter 31' and/or from the second inverter 31' to the second rotor windings 12'.

The third inverter 30 is configured to provide and/or receive an electric current, for example a DC electric current and/or an AC electric current, to/from the stator windings 21. The third inverter 30 is configured such that electric power may be transmitted, for example from the stator windings 21 to the third inverter 30 and/or from the third inverter 30 to the stator windings 21.

The first inverter 31, the second inverter 31' and the third inverter 30 are electrically connected to an energy storage device 40. The first inverter 31 and/or the second inverter 31' and/or the third inverter 30 may receive or provide electric power from or to the energy storage device 40. For example, the energy storage device 40 may be configured as or may include a battery or a rechargeable battery.

The first inverter 31 is configured to generate or produce an electric current in the first rotor windings 12 that generates or produces a first rotor magnetic field. For instance, the first inverter 31 and the first rotor windings 12 may be configured such that the first rotor magnetic field rotates with respect to the first rotor 10. The inverter 31' is configured to generate or produce an electric current in the second rotor windings 12' that generates or produces a second rotor magnetic field. For instance, the second inverter 31' and the second rotor windings 12' may be configured such that the second rotor magnetic field rotates with respect to the second rotor 10'. And the third inverter 30 is configured to generate or produce an electric current in the stator windings 21 that generates or produces a stator magnetic field. In particular, the third inverter 30 and the stator windings 21 may be configured such that the stator magnetic field rotates with respect to the stator 20. Each of the rotating magnetic fields may have a magnitude and/or phase different or equal from/to the magnitude and/or phase of the other rotating magnetic fields.

The stator magnetic field may interact with the first rotor magnetic field to provide a torque to the first rotor 10. Also, the stator magnetic field may interact with the second rotor magnetic field to provide a torque to the second rotor 10'. The torque being exerted on the first rotor 10 and/or on the second rotor 10' may cause the first rotor 10 and/or the second rotor 10' to rotate and to transmit, in each case, the torque to a vehicle wheel, for example via a drive axle or a drive half axle.

The third inverter 30 may be configured to receive electric power from the stator windings 21, for example during regenerative braking. This electric power may then be transmitted to and stored in the energy storage device 40. Additionally or alternatively, the first inverter 31 and/or the second inverter 31' may be configured to receive electric power from the first rotor windings 12 and/or from the second rotor windings 12', respectively, for example during regenerative braking.

The electric drive unit 1 of FIG. 1A may further include a first rotor position sensor 60 for detecting a rotational position of the first rotor, and a second rotor position sensor 60' for detecting a rotational position of the second rotor 10'. A rotational speed of the first rotor may be determined by mathematically differentiating the rotational position of the first rotor 10 with respect to time. Similarly, a rotational speed of the second rotor may be determined by mathematically differentiating the rotational position of the second rotor 10' with respect to time. The electric drive unit 1 of FIG. 1A may further include an accelerator actuator sensor 61 for detecting a position of an accelerator actuator indicative of a driver's torque request, and a steering sensor 62 for detecting a steering angle indicative of a target direction of a movement of the vehicle set by a driver. In certain situations, for example during autonomous driving and/or when a controller, for example a lane assistance controller and/or a speed controller is used, the target direction and/or a target speed may be determined by a computing device which may use an algorithm to perform this task. In such a situation, the one or more of the sensors may not be required. The above-described sensors may be part of or may include a speech recognition system, an interactive display, a joystick, a mouse or any other device providing a human machine interface, for example.

The electric drive unit 1 in FIG. 1A further comprises a controller 50. The controller 50 may, for example, include a microcontroller or another kind of computing device, for example an FPGA, a microprocessor, a computer, or the like. The controller 50 may be integrated into an electronic control unit (ECU) of a vehicle. In the embodiment depicted in FIG. 1A the controller 50 is communicatively connected, for example via an optical interface and/or an electrical interface, to the first inverter 31, to the second inverter 31' and to the third inverter 30. And the controller 50 is further communicatively connected, for example via an optical interface and/or an electrical interface, to at least one of the sensors, for example to the rotor position sensors 60 and/or 60', to the accelerator actuator sensor 61 and/or to the steering sensor 62.

The controller 50 may be configured to determine a target torque $T_1$ to be exerted on the first rotor 10 and/or to determine a target torque $T_2$ to be exerted on the second rotor 10', for example based on signals, data or information received from one or more of the sensors 60, 60', 61, and 62.

The controller 50 may be configured to control the first inverter 31, the second inverter 31' and the third inverter 30. The controller 50 may include a part in which a method of processing a sensor signal is implemented. For example, based on signals, data or information received from one or more of the sensors 60, 60', 61, and 62 the controller 50 may be configured to determine or calculate a torque to be exerted on one or both of the rotors 10, 10'. And based on a torque to be exerted on one or both of the rotors 10, 10' the controller 50 may be configured to determine or calculate a magnitude and/or a frequency and/or a phase of a current to be generated or produced in the stator windings 21 and/or in the first rotor windings 12 and/or in the second rotor windings 12' in order to exert said torque on one or both of the rotors 10, 10'. The controller 50 may then further be configured to control the first inverter 31 and/or the second inverter 31' and/or the third inverter 30 such as t to generate or produce an electric current in the stator windings 21 and/or in the first rotor windings 12 and/or in the second rotor windings 12' having the previously determined or calculated magnitude and/or frequency and/or phase to exert the previously determined or calculated or requested torque on one or both of the rotors 10, 10'.

For example, the controller 50 may be configured to determine a rotational position and/or a rotational speed of one of the rotors 10, 10' based on a signal provided by the first rotor position sensor 60 and/or based on a signal provided by the second rotor position sensor 60'. The controller 50 may then further be configured to determine the magnitude and/or the frequency and/or the phase of the current to be generated or produced in the first rotor windings 12 by the first inverter 31. And the controller 50 may be configured to control the first inverter 31 such as to generate or produce the previously determined current in the first rotor windings 12. Similarly, the controller 50 may be configured to determine the magnitude and/or the frequency and/or the phase of the current to be generated or produced in the second rotor windings 12' by the second inverter 31'. And the controller 50 may be configured to control the second inverter 31' such as to generate or produce the previously determined current in the second rotor windings 12'. Also, the controller 50 may be configured to determine the magnitude and/or the frequency and/or the phase of the current to be generated or produced in the stator windings 21 by the third inverter 30. The controller 50 may then further be configured to control the third inverter 30 such as to generate or produce the previously determined current in the stator windings 21.

As a non-limiting example, the controller 50 according to the embodiment of FIG. 1A may be configured to implement a field-oriented control scheme. Field-oriented control is also known as vector control. For example, the controller 50 may be configured to mathematically map an electric current in the stator windings 21 corresponding to a rotating stator magnetic field onto a fixed orthogonal reference frame comprising an $I_q$ axis and $I_d$ axis orthogonal to the $I_q$ axis, wherein $I_q$ and $I_d$ correspond to the two orthogonal current components torque current $I_q$ and magnetizing current $I_d$, respectively. The controller 50 may then further be configured to map the electric current in the stator windings 21 onto the $I_q$ axis of the fixed orthogonal reference frame. The controller may further be configured to map the electric current in the first rotor windings 12 and the electric current in the second rotor windings 12' onto the same fixed orthogonal reference frame, wherein each electric current within the rotor windings 12, 12' is split into the torque current $I_q$ component and the magnetizing current $I_d$ component. The mathematical mapping may be performed using a rotation matrix which may include a rotation angle of the rotating magnetic field as a parameter. In the fixed orthogonal reference frame, the electric current in the stator windings 21 is denoted as $I_{sq}$, the control current and the magnetizing current of the first rotor 10 are denoted $I_{R1q}$ and $I_{R1d}$, respectively, and the torque current and the magnetizing current of the second rotor 10' are denoted $I_{R2q}$ and $I_{R2d}$, respectively. Using the fixed orthogonal reference frame in the control of the currents may simplify calculations and control of the electric drive unit 1. The mapping of the electric current in the first rotor windings 12 and of the electric current in the second rotor windings 12' may be accomplished using the rotational position of the first rotor 10 and the rotational position of the second rotor 10', for example based on signals, data or information provided by the first rotor position sensor 60 and the second position sensor 60', respectively.

The controller 50 may then be configured to calculate magnitude, frequency and phase of a current or currents to be produced or generated in the first rotor windings 12 and/or in the second rotor windings 12' and/or in the stator windings 21 by minimizing a cost function. For example, the cost function may include a sum including squared magnitudes of one or more electric currents. For example, the cost function P may be given by $$P = 1.5 \cdot R_s \cdot I^2_{sq} + 1.5 \cdot R_R \cdot (I^2_{R1q} + I^2_{R1d} + I^2_{R2q} + I^2_{R2d}) \quad \text{(eq. 1)}$$

where $R_s$ is the ohmic resistance of the stator windings 21, and $R_R$ is the ohmic resistance of the first rotor windings 12 and/or of the second rotor windings 12'. This cost function includes ohmic losses within the stator windings 21 and the first and the second rotor windings 12, 12'. Minimizing this cost function and controlling the first inverter 31 and/or the second inverter 31' and/or the third inverter 30 accordingly may significantly increase the efficiency of the electric drive unit 1.

The cost function P may be minimized for a given rotational speed $\Omega_1$ of the first rotor 10, a given rotational speed $\Omega_2$ of the second rotor 10', a given target torque $T_1$ for the first rotor 10, and a given target torque $T_2$ for the second rotor 10'. The target torques $T_1$ and $T_2$ may be considered as equality constraints when minimizing the cost function. The rotational speeds $\Omega_1$ and $\Omega_2$ may be determined based on signals, data or information provided to the controller 50 by the rotor positions sensors 60 and 60', for example. The controller 50 may be configured to determine the target torques $T_1$ and $T_2$ based on a driving situation which may relate to signals, data or information provided by one or more of the sensors 60, 60', 61 and/or 62. Additionally, the controller may be configured to determine the target torques $T_1$ and $T_2$ based on vehicle dynamics, for example based on one or more parameters including a vehicle mass, a moment of inertia, a friction, a spring force, a stiffness and further material parameters.

For example, in the embodiment of the electric drive unit depicted in FIG. 1A the target torques $T_1$ and $T_2$ may be related to the electric currents according to the following relations $$T_1 = 1.5 \cdot N_p \cdot L_m \cdot I_{R1d} \cdot I_{sq} \quad \text{(eq. 2)}$$

$$T_2 = 1.5 \cdot N_p \cdot L_m \cdot I_{R1d} \cdot I_{sq} \quad \text{(eq. 3)}$$

where $N_p$ denotes a number of pole pairs and $L_m$ denotes an inductance of a rotor 10, 10', wherein the inductance refers to the magnetic field linking stator and rotor.

Further constraints of the minimization of the cost function P may include a maximum allowable magnitude of an electric current and/or a maximum allowable voltage in one or more of the windings 12, 12', 21 and/or in one or more of the inverters 30, 31, 31'.

For instance, the constraints relating to the electric currents may be expressed by but not limited to the following relations $$I^2_{R1q} + I^2_{R1d} \leq I^2_{R1max} \quad \text{(eq. 4)}$$

$$I^2_{R2q} + I^2_{R2d} \leq I^2_{R2max} \quad \text{(eq. 5)}$$

$$|I_{sq}| \leq I_{sqmax} \quad \text{(eq. 6)},$$

where $I_{R1max}$ denotes a maximum value of an electric current in the first rotor windings 12, $I_{R2max}$ denotes a maximum value of an electric current in the second rotor windings 12', and $I_{sqmax}$ denotes a maximum value of an electric current in the stator windings 21. Similarly, the constraints relating to the voltages may be expressed by but not limited to the following relations $$V^2_{sq} + V^2_{sd} \leq V^2_{smax} \quad \text{(eq. 7)}$$

$$V^2_{R1q} + V^2_{R1d} \leq V^2_{R1max} \quad \text{(eq. 8)}$$

$$V^2_{R2q} + V^2_{R2d} \leq V^2_{R2max} \quad \text{(eq. 9)}$$

Therein, referring to the fixed orthogonal reference frame:
$V_{sq}$ is a component of the voltage of the stator windings 21 in the direction of the $I_{sq}$ axis,
$V_{sd}$ is a component of the voltage of the stator windings 21 in the direction of the $I_{sd}$ axis,
$V_{smax}$ is a maximum voltage of the stator windings,
$V_{R1q}$, $V_{R2q}$ are components of the voltage of the first rotor windings 12 and of the second rotor windings 12', respectively, in the direction of the $I_{sq}$ axis,
$V_{R1d}$, $V_{R2d}$ are components of the voltage of the first rotor windings 12 and of the second rotor windings 12', respectively, in the direction of the $I_{sd}$ axis, and
$V_{R1max}$, $V_{R2max}$ are a maximum voltage in the first rotor windings 12 and in the second rotor windings 12', respectively.

The maximum voltages $V_{R1max}$, $V_{R2max}$, and $V_{smax}$ may depend on properties of the first inverter 31, second inverter 31', and third inverter 30, respectively. Additionally or alternatively, they may depend on properties of the windings 12, 12' and 21, for example on properties relating to an electrical insulation system. $V^2_{R1max}$ may equal $V^2_{R2max}$.

Furthermore, a voltage V in the windings 12, 12' and 21 is physically related to an electric current I in the windings 12, 12' and 21, for example according to the relation $$V = L \cdot dI/dt,$$

where d/dt denotes the derivative with respect to time and L is an inductance of the windings 12, 12' and 21, respectively. The magnitude of the voltage V may depend on the magnitude of the electric current I. In case the electrical current is an AC current, the voltage may further depend on a frequency of the electric current. Therefore, the controller 50 may further be configured to optimize the cost function P with a frequency of the electric currents as input parameters and/or as optimization parameters.

The controller 50 may be configured to minimize the cost function using a mathematical method, for example including the calculation of a derivative and finding a zero value thereof. The controller 50 may further be configured to minimize the cost function using other optimization algorithms, for example a gradient descent algorithm or the like. The minimization may be performed with respect to one or more of the parameters of the cost function comprising, for example the frequency and/or magnitude of the currents $I^2_{sq}$, $I^2_{R1q}$, $I^2_{R1d}$, $I^2_{R2q}$, and $I^2_{R2d}$.

As a result of the optimization the controller 50 may control the third inverter 30 such that the stator magnetic field rotates at a rotational frequency close to the speed of the one of the rotors 10, 10' transmitting the greater torque $T_1$ or $T_2$. For example, the rotational frequency of the stator magnetic field may deviate from the rotational frequency of the rotor transmitting the greater torque by less than plus/minus 5 percent, such as by less than plus/minus 2 percent, for instance by less than plus/minus 1 percent. In this way, a power flow through the first and/or the second inverter may be limited.

One advantage of the electric drive unit 1 of FIG. 1A is the flexibility with which electric currents in the first and the second rotor windings 12, 12' and in the stator windings 21 may be controlled. For example, the currents in the rotor windings 12, 12' of the electric drive unit 1 may be operated in a manner similar to a synchronous machine and similar to an induction machine. The electric currents in the windings 12, 12', 12 may be controlled such as to minimize a cost function that may include terms relating to or correlated with the efficiency of the electric drive unit 1 such as the power consumption. Also, disposing the two rotors 10, 10' within the stator 20 may render the design of the electric drive unit 1 compact as only one stator is used for the two rotors. Furthermore, the total torque exerted on both rotors 10, 10' as well as the ratio between the amount of torque exerted on the first rotor 10 and the amount of torque exerted on the second rotor 10' may be controlled with high flexibility and power efficiency.

Figure 1B:
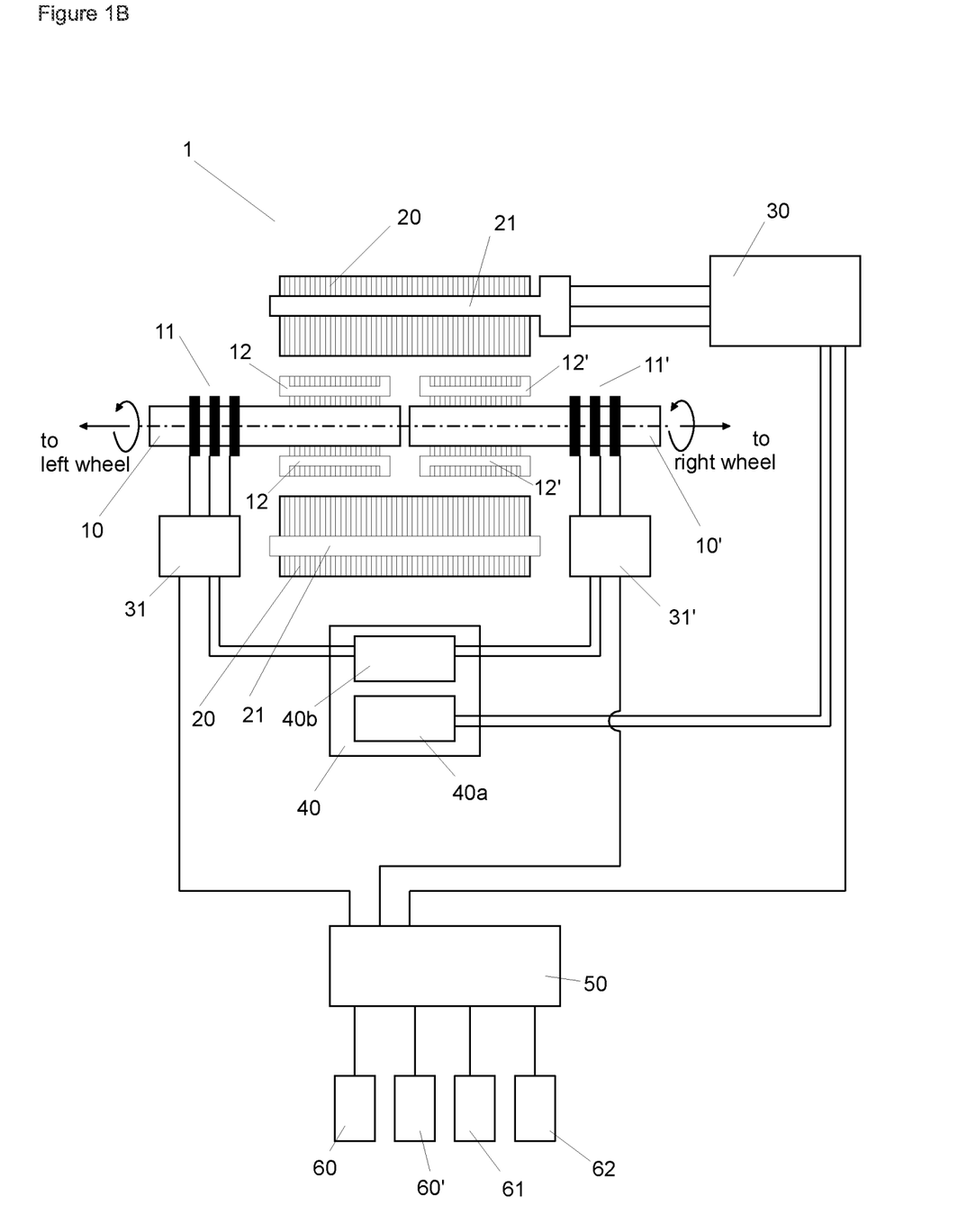
FIG. 1B schematically shows another embodiment of an electric drive unit of the presently proposed type, wherein the at least one energy storage device includes a high voltage energy storage device and a low voltage energy storage device.

FIG. 1B schematically shows an alternative embodiment of the electric drive unit 1 which is a variant of the embodiment shown in FIG. 1A. Here and in all of the following, recurring features illustrated in different Figures are designated with the same reference signs. The electric drive unit according to FIG. 1B differs from the electric drive unit according to FIG. 1A in that in the electric drive unit according to FIG. 1B the energy storage device 40 includes a high voltage energy storage device 40a and a low voltage energy storage device 40b. The high voltage energy storage device 40a is electrically connected to the inverter 30. The low voltage energy storage device 40b is electrically connected to the first inverter 31 and to the second inverter 31'. Accordingly, the first and the second inverters 31, 31' are low voltage inverters and the third inverter is a high voltage inverter. The low voltage inverter is designed to operate at low voltages. The high voltage inverter is designed to operate at high voltages. For example, the high voltage energy storage device 40a and the high voltage inverter 30 may be configured to operate at voltages at or below a maximum voltage of at least 60 V, of at least 200 V, or of at least 380 V. And the low voltage energy storage device 40b and the low voltage inverters 31, 31' may be configured to operate at voltages at or below a maximum voltage of at most 48 V or of at most 60 V.

For example, a high voltage may be suitable to be used in a main power path that may include the stator windings 21, the third inverter 30 and the high voltage energy storage device 40a. On the other hand, components that can resist a high voltages are usually more expensive than components that may resist only a low voltage. Low voltage components may include, for example, field effect transistors such as metal-oxide-semiconductor field-effect transistors (MOSFETs), while high voltage components may include, for example, insulated-gate bipolar transistors (IGBTs). Further, some constraints are less restrictive for low voltage components, resulting in reduced production and maintenance costs.

Therefore, it is typically advantageous to use low voltage components where possible. This may be the case for the first rotor 10 and for the second rotor 10', for the first inverter 31 and for the second inverter 31'. For instance, in the embodiment of the electric drive unit 1 of FIG. 1B a low voltage energy storage device 40b is connected to the first rotor 10 and to the second rotor 10' via the first inverter 31 and the second inverter 31'.

Figure 2:
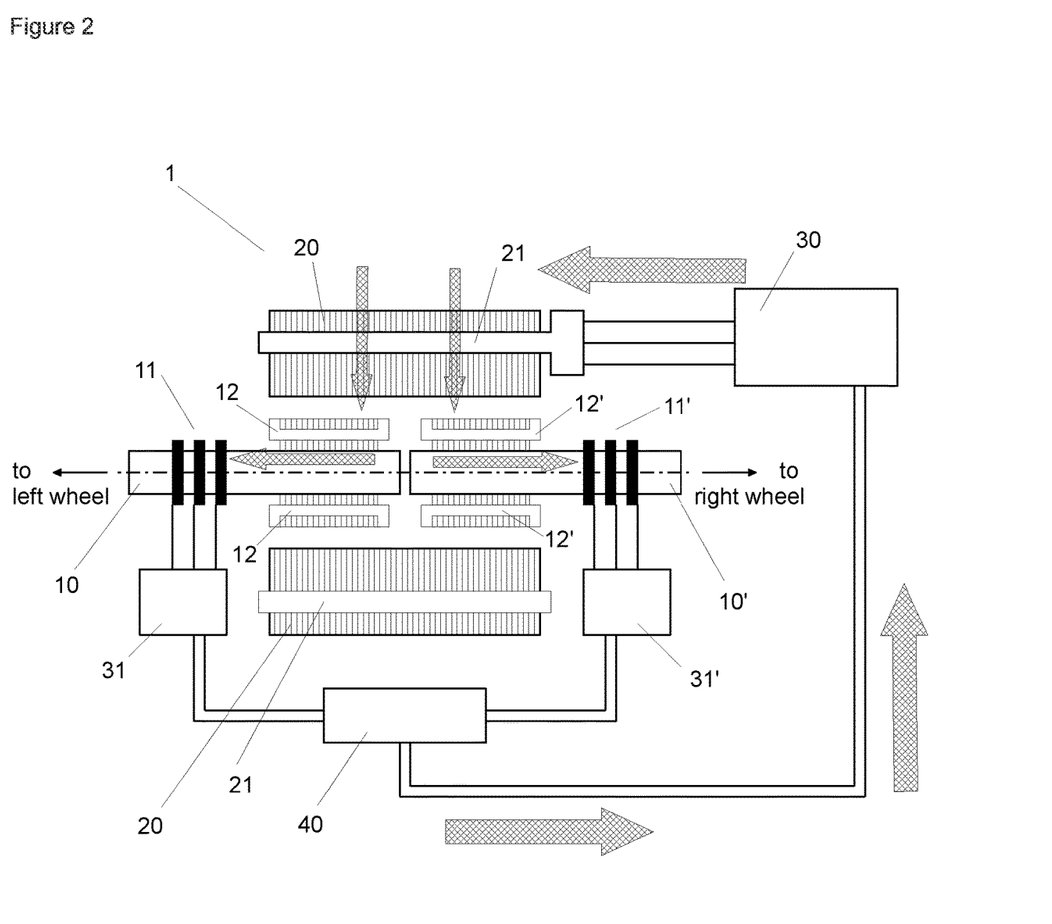
FIG. 2 schematically shows the embodiment of the electric drive of FIG. 1A, additionally illustrating the transmission of power in the electric drive unit according to a first mode of operation, FIG. 3 schematically shows the electric drive unit of FIG. 2, additionally illustrating the transmission of power in the electric drive unit according to a second mode of operation, and FIG. 4 schematically shows the electric drive unit of FIG. 1B, additionally illustrating the transmission of power in the electric drive unit according to a third mode of operation.

FIG. 2 again schematically shows the electric drive unit 1 of FIG. 1a in a first driving situation. For ease of illustration only the controller 50 and the sensors 60, 60', 61 and 62 have been omitted, and additional arrows symbolising power transmission paths are shown. The situation depicted in FIG. 2 may occur, for example, if or when both rotors 10, 10' turn at the same speed and if or when the same amount of torque is applied to both rotors 10, 10'. In this situation, the controller 50 may control the third inverter 30 such that a rotational speed of the rotating stator magnetic field is equal to a mechanical rotational speed of the rotors 10, 10' relative to the stator 20. That is, the controller 50 may control the third inverter 30 such that a frequency of the electric current generated or produced in the stator windings 21 equals a mechanical rotational speed or frequency of the first rotor 10 and of the second rotor 10'. The controller 50 controls the first inverter 31 and the second inverter 31' such that they provide a direct current to the first rotor windings 12 and to the second rotor windings 12', respectively. As such, the electric drive unit 1 may show characteristics of a synchronous machine, wherein the two rotors 10 and 10' rotate in synchrony or in unison with the stator magnetic field. In FIG. 2 power is transmitted from the energy storage device 40 to the third inverter 30, from the third inverter 30 to the stator windings 21, and from the stator windings 21 to the rotors 10, 10' via the first rotor windings 12 and via the second rotor windings 12', respectively. The first rotor 10 and the second rotor 10' may then transfer torque to a first vehicle wheel and to a second vehicle wheel, for example.

Figure 3:
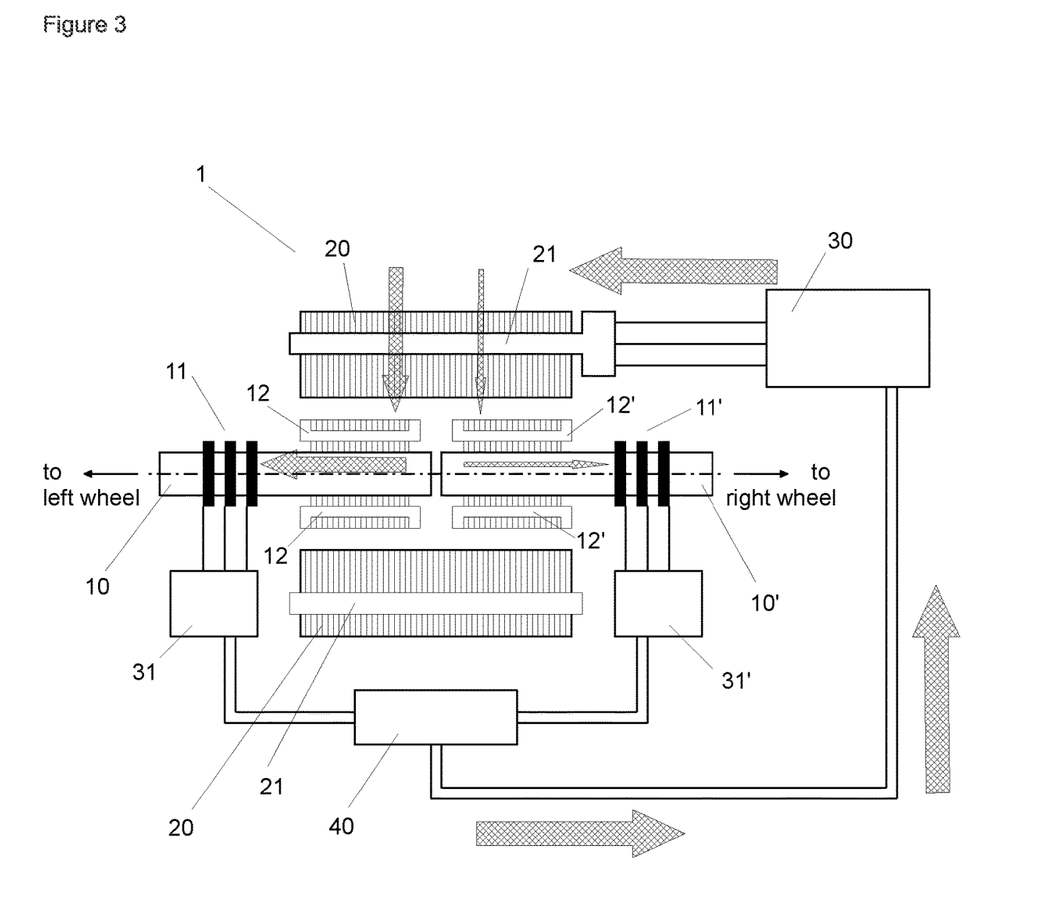

FIG. 3 again schematically shows the electric drive unit 1 of FIG. 1a in a second driving situation. Again, the controller 50 and the sensors 60, 60', 61 and 62 have been omitted for ease of illustration, and additional arrows symbolising power transmission paths are shown. The different sizes of the arrows depicted in FIG. 3 illustrate that a power transmitted to the first rotor 10 is different from a power transmitted to the second rotor 10'. For instance, in the situation depicted in FIG. 3 a power transmitted to the first rotor 10 is greater than a power transmitted to the second rotor 10'.

The driving situation depicted in FIG. 3 may occur, for example, if or when both rotors 10, 10' turn at the same speed, and if or when a torque applied to the first rotor 10 is different from a torque applied to the second rotor 10', for example when the vehicle wheels coupled to the first rotor 10 and to the second rotor 10' travel on different soil types. In FIG. 3, a torque applied to the first rotor 10 is greater than a torque applied to the second rotor 10'.

In the situation depicted in FIG. 3 the controller 50 may control the third inverter 30 such that a rotational speed of the rotating stator magnetic field is equal to the mechanical rotational speed of the rotors 10, 10'. That is, the controller 50 may control the third inverter 30 such that a frequency of the electric current provided to or generated in the stator windings 21 equals the rotational speed or rotational frequency of the rotors 10, 10'. The controller 50 controls the inverters 31, 31' such that they provide a direct current to the first rotor windings 12 and to the second rotor windings 12', respectively. The fact that different amounts of torque are applied to the first rotor 10 and to the second rotor 10' is reflected by different magnitudes of the direct currents provided to the rotors 10, 10' by the first inverter 31 and by the second inverter 31', respectively. In the situation depicted in FIG. 3, the electric drive unit 1 may resemble a synchronous machine in which the two rotors 10 and 10' rotate in synchrony or in unison with the stator magnetic field.

In FIG. 3 power is transmitted from the at least one energy storage device 40, which may include a high voltage energy storage device 40a and a low voltage energy storage device 40b, to the third inverter 30, from the third inverter 30 to the stator windings 21, and from the stator windings 21 to the rotors 10, 10' via the first rotor windings 12 and via the second rotor windings 12', respectively. The first rotor 10 and the second rotor 10' may then transfer torque to a first vehicle wheel and to a second vehicle wheel, for example. In contrast to the situation depicted in FIG. 2, in the situation depicted in FIG. 3 the power transmitted to the first rotor 10 is different from the power transmitted to the second rotor 10', resulting in different amounts of torque being exerted on the first rotor 10 and on the second rotor 10'.

Figure 4:
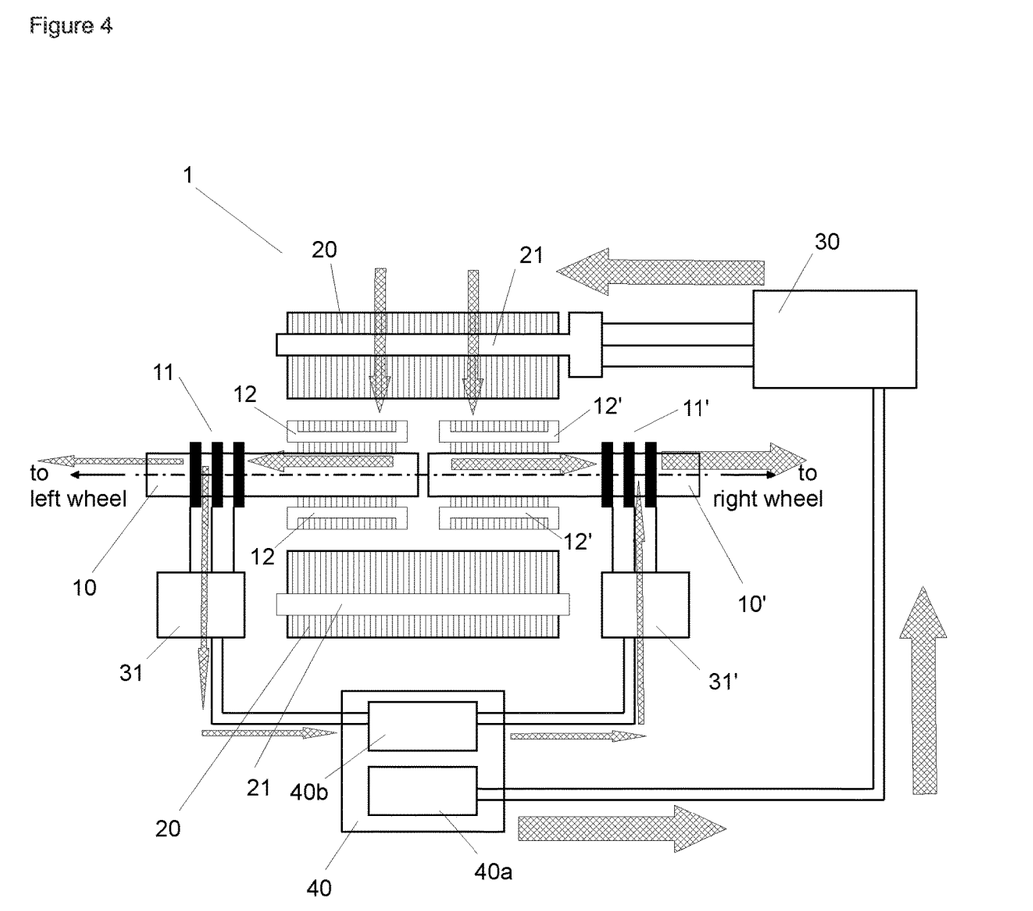

FIG. 4 again schematically shows the electric drive unit 1 of FIGS. 2 and 3, wherein the additional arrows symbolise power transmissions. FIG. 4 relates to a driving situation in which a rotational speed of the second rotor 10' is greater than a rotational speed of the first rotor 10, and a torque applied or transmitted to the first rotor 10 via the stator 20 is equal to a torque applied or transmitted to the second rotor 10' via the stator 20.

The controller 50 determines a rotational speed of the rotating stator magnetic field. The controller 50 commands the third inverter 30 to provide an electric current to the stator windings 21 resulting in a rotating stator magnetic field having a rotational frequency corresponding to a rotational speed in between the rotational speed of the first rotor 10 and the rotational speed of the second rotor 10'. In this case, the first rotor 10 and the stator 20 provide torque to the first vehicle wheel. At the same time, the first rotor 10 operates as an electric generator providing electric power to the energy storage device 40, such as to the low voltage energy storage device 40*b*, via the first inverter 31. Again, the first inverter 31 may be configured as a low power inverter in FIG. 4. At the same time, the second rotor 10' and the stator 20 provide torque to the second vehicle wheel. The second rotor 10' receives electric power from the energy storage device 40, such as from the low voltage energy storage device 40*b*, via the second inverter 31'. Again, is the second inverter 31' may be configured as a low power inverter in FIG. 4. As the stator 20 transmits the same power to both rotors 10 and 10'.

When the stator 20 applies or transmits different torques to both rotors 10 and 10', the power transmitted from the stator 20 to the rotors 10, 10' will change accordingly. In this case, the controller 50 may be configured to control the third inverter 30 to generate or produce an electric current in the stator windings 21 which generates a rotating stator magnetic field having a rotational frequency close to or within a range or within a predetermined range of a rotational speed of the rotor transmitting the greater torque in order to limit the electric power transmitted through the low-power inverters 31 and 31'.

LIST OF REFERENCE NUMERALS

1 electric drive unit
10 first rotor
10' second rotor
11 first slip rings
11' second slip rings
12 first rotor windings
12' second rotor windings
20 stator
21 stator windings
30 third inverter
31 first inverter
31' second inverter
40 energy storage device
40*a* high voltage energy storage device
40*b* low voltage energy storage device
50 controller
60, 60' rotor position sensors
61 accelerator actuator sensor
62 steering sensor

The invention claimed is:

1. An electric drive unit, comprising:
 a stator configured to produce a stator magnetic field,
 at least a first rotor including first rotor windings,
 at least a first inverter electrically connected with the first rotor windings and configured to produce an electric current in the first rotor windings for producing a first rotor magnetic field,
 a second rotor including second rotor windings, the second rotor windings including multi-phase windings,
 a second inverter electrically connected with the second rotor windings and configured to produce an electric current in the second rotor windings for producing a second rotor magnetic field, and
 a third inverter,
 wherein the stator magnetic field is configured to interact with the first rotor magnetic field to exert a torque on the first rotor, wherein the first rotor windings include multi-phase windings, wherein the stator magnetic field is configured to interact with the second rotor magnetic field to exert a torque on the second rotor, wherein the stator includes stator windings, the stator windings including multi-phase windings, wherein the third inverter is electrically connected with the stator windings and configured to produce an electric current in the stator windings for producing the stator magnetic field, wherein the first inverter includes a low voltage inverter, wherein the third inverter includes a high voltage inverter, and wherein a maximum operating voltage of the high voltage inverter is greater than a maximum operating voltage of the low voltage inverter.

2. The electric drive unit of claim 1, further comprising at least one energy storage device including one or more rechargeable batteries electrically connected with the first inverter, and further electrically connected with the second inverter and/or with the third inverter.

3. The electric drive unit of claim 2, wherein the at least one energy storage device comprises a low voltage energy storage device electrically connected with the first inverter, and further electrically connected with the second inverter, and a high voltage energy storage device electrically connected with the third inverter,
 wherein a maximum operating voltage of a high voltage energy storage device is higher than a maximum operating voltage of the low voltage energy storage device, wherein the maximum operating voltage of the high voltage energy storage device is higher than 60 V, higher than 200 V, or higher than 380 V, and/or wherein the maximum operating voltage of the low voltage energy storage device is at most 60 V, or at most 48 V.

4. The electric drive unit of claim 1, further comprising:
 at least one sensor configured to produce at least one sensor signal, and
 at least one controller configured to control the first inverter, and further configured to control the second inverter and/or the third inverter, based on the at least one sensor signal.

5. The electric drive unit of claim 4, wherein the at least one sensor includes one or more of:
 an accelerator actuator sensor,
 a steering sensor,
 a first rotor position sensor configured to acquire first rotor position data indicative of a rotational position of the first rotor, and a second rotor position sensor configured to acquire second rotor position data indicative of a rotational position of the second rotor.

6. The electric drive unit of claim 4, wherein the controller is configured to evaluate a cost function having at least magnitudes of the electric currents in windings and an electrical frequency of electrical current in the stator windings as inputs, and to control the first inverter, the third inverter, and the second inverter based on the evaluation.

7. The electric drive unit of claim 6, wherein function values of the cost function correlate with ohmic losses, iron losses, and/or inverter losses associated with the inputs of the cost function, and wherein the controller is configured to control the inverters to minimize the cost function.

8. The electric drive unit of claim 7, wherein the controller is configured to control a magnitude and/or frequency of an electrical current in the first rotor windings produced by the first inverter, and to control the magnitude and/or frequency of an electrical current in the second rotor windings produced by the second inverter, based on the evaluation of the cost function and based on first rotor position data and/or based on second rotor position data.

9. The electric drive unit of claim 4, wherein the controller is configured to control the first inverter, the third inverter, and the second inverter such that magnetic fields produced by electric currents in the rotating rotor windings and in the stator windings rotate at the same frequency with respect to the stator.

10. The electric drive unit of claim 4, wherein the controller is configured to determine a first target torque to be exerted on the first rotor and to determine a second target torque to be exerted on the second rotor, and wherein the controller is configured to control the inverters to exert on the first rotor a torque within a range of the first target torque, and to exert on the second rotor a torque within a range of the second target torque.

11. The electric drive unit of claim 4, wherein the controller is configured to control the third inverter based on rotational speeds $\Omega 1$, $\Omega 2$ of the first rotor and of the second rotor, respectively.

12. The electric drive unit of claim 11, wherein the controller is configured to control the third inverter such that a rotational frequency of a rotating magnetic field produced by electric currents in the stator windings is in between $\Omega 1$ and $\Omega 2$.

13. The electric drive unit of claim 11, wherein the controller is configured to control the third inverter such that a rotational frequency of a rotating magnetic field produced by electric currents in the stator windings is below $\Omega 1$ and $\Omega 2$, or wherein the controller is configured to control the third inverter such that a rotational frequency of a rotating magnetic field produced by electric currents in the stator windings is above $\Omega 1$ and $\Omega 2$.

14. The electric drive unit of claim 4, wherein the controller is configured to control the first inverter and the second inverter and/or the third inverter such that a value of an operating parameter of the first inverter and a value of an operating parameter of the second inverter and/or of the third inverter does not exceed a predetermined maximum value.

15. The electric drive unit of claim 1, wherein the first inverter is configured to produce an AC and a DC electric current in the first rotor windings, and/or wherein the second inverter is configured to produce an AC and a DC electric current in the second rotor windings.

16. A method of operating an electric drive unit including a stator, at least a first rotor including first rotor windings, and a low voltage inverter electrically connected with the first rotor windings, the method comprising:
producing a stator magnetic field via a high voltage inverter, and
using the low voltage inverter to produce an electric current in the first rotor windings to produce a first rotor magnetic field,
wherein the stator magnetic field interacts with the first rotor magnetic field to exert a torque on the first rotor, and wherein a maximum operating voltage of the high voltage inverter is greater than a maximum operating voltage of the low voltage inverter.

\* \* \* \* \*